3,250,812
PREPARATION OF ALKYL ARYL SULFONES
Everett E. Gilbert, Morris Township, Morris County, N.J., assignor to Allied Chemical Corporation, New York, N.Y., a corporation of New York
No Drawing. Filed Jan. 16, 1963, Ser. No. 251,730
13 Claims. (Cl. 260—607)

This invention relates to organic sulfones. More particularly, this invention relates to alkyl aryl sulfones and a process for producing the same.

In the preparation of alkyl aryl sulfones it has formerly been the practice to employ a complex series of reactions which needless to say made the production of these compounds economically as well as scientifically difficult.

An object of this invention is, therefore, to provide a method whereby alkyl aryl sulfones can be readily produced without employing excessive process procedures. Another object of this invention is to provide a process for producing alkyl aryl sulfones economically by saving time in its preparation and cost of reactants. Still another object of this invention is to provide new alkyl aryl sulfones heretofore never produced. Other objects and advantages will become apparent from the following more complete description and claims.

Broadly, this invention contemplates a process for producing alkyl aryl sulfones which comprises reacting an aryl compound having free hydrogen on the ring with a compound representable by the formula $(R_1SO_2)_2O$, wherein $R_1$ is a lower alkyl radical in a solvent at sufficient temperatures to effect said reaction.

Suitable solvents which may be used as a reaction medium according to the process of this invention are those in which both reactants have a substantial degree of solubility and which are either inert under the reaction conditions or are the aryl reactant. The solvent aids in controlling temperature and protects the aryl compound from the deleterious action of the by-product alkyl sulfonic acid. In particular, halogenated organic solvents, such as tetrachloroethylene, pentachloroethane, trichloroethylene and the like may be used. Examples of reactants which may simultaneously serve as solvents are chlorobenzene, metaxylene, and mesitylene. Aside from this, the selection of a solvent will be largely within the skill of the art as deduced from the teachings herein.

It has been found that the reaction of the aryl compound with the alkyl sulfonic anhydride can be performed at temperature ranging between about 100° C. and about 200° C. or more at atmospheric pressure. While these broad ranges are applicable, it is preferred to operate the reaction at temperatures between 115° C. and 150° C.

The selection of a vessel in which the reaction is to proceed is not critical but it is preferred that a vessel adaptable for refluxing be used since the reaction between the alkyl sulfonic anhydride and the aryl compound is not instantaneous but rather takes some time for the product to form and to facilitate the reaction and control the temperature, heating under reflux is advantageous. The reaction period will depend upon the temperature employed. In the preferred process, the system of aryl compound, alkyl sulfonic anhydride and solvent are refluxed for at least about three hours and not more than 20 hours. At the end of the refluxing procedure, the appropriate sulfone is separated from the remainder of the system by standard methods.

In order to more fully illustrate the nature of the process of this invention, the following equation is reproduced.

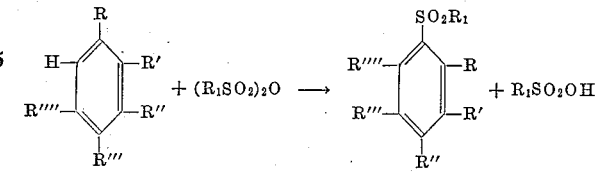

As indicated above, the various R groups on the aryl compound may vary and accordingly the sulfone thereby achieved will vary leaving a considerable number of possible aryl sulfone derivatives which can be provided by the process of this invention.

While any lower alkyl sulfonic acid anhydride having the formula $(RSO_2)_2O$ may be satisfactorily used as a reactant, it is preferred that the alkyl group be one having between 1 and 4 carbon atoms inclusive, the most preferred compound being $(CH_3SO_2)_2O$.

In order to more easily describe the nature of the instant process and the manner of practicing the same, the following examples are presented. In all of the examples the reaction and recovery procedures were as described in Example 1 except as otherwise stated.

*Example 1*

6.0 grams of anisole (0.056 mole) were mixed in a flask containing 9 grams of methane sulfonic anhydride (0.052 mole) and 50 ml. of tetrachloroethylene. The flask was equipped with a reflux condenser and the solution therein was refluxed briskly for 16 hours. The temperature of the system was maintained at about the boiling point of the tetrachloroethylene solvent, namely, 121° C. The cooled reaction mixture was extracted with two 25 ml. portions of warm water to remove methane-sulfonic acid and any unreacted anhydride. The aqueous extracts were then combined, cooled, and extracted with ether to recover any dissolved product. The ether extract and the tetrachloroethylene solution of the product were combined and evaporated to constant weight on a steam bath in a stream of air. The crude product solidified upon cooling and stirring. It was recrystallized from n-butanol and identified by mixed melting point as methyl 4-methoxyphenyl sulfone. The percent yield of methyl 4-methoxyphenyl sulfone was 70 percent.

*Example 2*

Two new aryl sulfones were provided by reacting 6 grams of very pure 1,2,3-trimethylbenzene with 9 grams of methyl sulfonic acid anhydride. The reaction was performed in 50 ml. of tetrachloroethylene in a vessel fitted with apparatus for refluxing. The reaction mixture was refluxed for 16 hours at about 121° C. The trichloroethylene layer which was formed was evaporated down to about ½ of its original volume and subsequently cooled. On cooling, gray crystals crystallized from solution. These crystals were filtered from the liquid, recrystallized from butanol, and their melting point was determined to be 121° C. The filtrate was further evaporated down to about ⅙ of the original volume whereupon a second crop of crystals crystallized from the filtrate. These crystals were filtered from the liquid and their melting point was determined to be 97° C. Infrared analysis was performed on both of these products and the analysis showed that both were methyl sulfones of 1,2,3-trimethylbenzene. The analysis, however, failed to show which of these compounds was methyl 2,3,4-trimethyl sulfone and which was methyl 3,4,5-trimethyl sulfone. However, it is theorized that the compound having the melting point of about 121° C. is the more symmetrical isomer i.e. methyl 3,4,5-trimethylphenyl sulfone. Since these compounds have never been heretofore synthesized no literature is available to confirm the above. The total yield of both isomers was 82 percent.

*Example 3*

1,3-xylene was reacted in similar manner to the above examples with a reaction time of 16 hours. A 75 percent yield of methyl 2,4-dimethylphenyl sulfone was obtained having a high purity as determined by melting point tests (M.P. 56° C.) as well as percent sulfur analysis.

*Example 4*

A new xylene derivative was provided by reacting 6 grams 1,4-xylene with methyl sulfonic acid anhydride as in Example 3 with the exception that the reaction time was only 8 hours. A relatively high yield was obtained. The compound has high purity as determined by chemical analysis. The compound was methyl 2,5-dimethylphenyl sulfone having a melting point at about 45° C.

*Example 5*

4.6 grams of toluene were reacted with 9 grams of methyl sulfonic acid anhydride at a temperature ranging between 110° C. and 121° C. for a period of about 20 hours. The product obtained from the reaction was in the form of an oil. The oil was placed in a vessel containing butanol and the vessel was ice-cooled resulting in crystallization of 0.5 gram of methyl 4-methylphenyl sulfone. The remainder of the oil was thought to contain small amounts of the ortho-isomer i.e. methyl 2-methylphenyl sulfone. The melting point of the para-isomer was determined to be about 87.5° C. The total yield obtained by the reaction was relatively high and the methyl 4-methylphenyl sulfone obtained was relatively pure.

*Example 6*

A 71 percent yield of methyl 2,4,6-trimethylphenyl sulfone was obtained by reacting 6.0 grams of 1,3,5-trimethylbenzene (mesitylene) with 9 grams of $(CH_3SO_2)_2O$ for 8 hours. The purity of the product was similarly excellent. The melting point of the product was found to be about 130° C.

*Example 7*

Another new alkyl sulfonyl phenyl compound was synthesized by the process of the above examples using 7.0 grams of 1,2,4,5-tetramethylbenzene together with 9 grams of $(CH_3SO_2)_2O$. A 57 percent yield of crude methyl 2,3,5,6-tetramethylphenyl sulfone was obtained. The product was recrystallized from butanol and the melting point was determined to be 130° C. The product was obtained with high purity. The reaction was performed for 8 hours.

*Example 8*

In a manner similar to Example 7, pure methyl 4-chlorophenyl sulfone was produced by the reaction of $$(CH_3SO_2)_2O$$

with chlorobenzene. The reaction was performed over a period of 24 hours. The melting point was about 95.5–7° C.

*Example 9*

In a manner similar to Example 7, pure methyl 4-biphenylyl sulfone was obtained by refluxing $(CH_3SO_2)_2O$ for 16 hours together with biphenyl. A suitable yield of sulfone was produced having a melting point of 144° C.

*Example 10*

Methyl 2-methoxy-5-methylphenyl sulfone was prepared in similar manner by reacting 4-methylanisole with $(CH_3SO_2)_2O$ for 16 hours. The product obtained had high purity and a melting point of about 86° C.

*Example 11*

Similarly, methyl 2,4 dimethoxy phenyl sulfone (melting point about 105° C.) was obtained by the reaction of 1,3-dimethoxybenzene with the alkyl sulfonic acid anhydride. This product which has heretofore never been produced was obtained with good purity in a substantial yield.

Other compounds which have also reacted with the alkyl sulfonic acid anhydride include, in particular, naphthalene, ethylbenzene, diphenylether, and 2-phenylanisole. The process of this invention can be performed by reacting a mono-substituted aryl compound the substitution constituent of which is representable by the symbol —OR, where R is selected from the group consisting of aryl and alkyl with the aforementioned alkyl sulfonic acid anhydrides. Naphthalene gave a high yield of a mixture of the alpha and beta alkyl sulfone.

These alkyl sulfonyl aryl compounds have a wide variety of uses ranging from application in the tanning industry to use as a drug. Generally, methyl sulfonyl benzene derivatives have been used as amoebicides. The naphthalene derivatives have been found useful as artificial tanning agents while the other alkyl aryl sulfones may serve as chemical intermediates for a host of end products. These include the diethyl substituted phenyl phosphates which have biological activity.

In the above examples the sulfonic acid anhydride was $(CH_3SO_2)_2O$ but it is also to be recognized that any other lower alkyl sulfonic acid anhydride, e.g. ethyl sulfonic acid anhydride, propyl sulfonic acid anhydride, butyl sulfonic acid anhydride and substituted alkyl sulfonic acid anhydrides, is similarly applicable and the manipulative procedure does not vary from one lower alkyl anhydride to another. In carrying out the procedure of this invention, it was found that the purity of the reagents used was an important factor but by no means an essential ingredient of the invention. The disadvantages attendant with the employment of an impure reactant are obvious to one skilled in the art after having viewed the instant invention.

While certain preferred embodiments have been specifically disclosed herein, it will be evident that one may make certain modifications without departing from the spirit or scope of the invention.

I claim:

1. A process for producing alkyl aryl sulfones which comprises reacting an aryl compound having free hydrogen on the ring with a compound having the formula $(R_1SO_2)_2O$, wherein $R_1$ is a lower alkyl radical in a solvent at sufficient temperatures to effect said reaction.

2. A process according to claim 1 wherein said temperature is between about 100° C. and about 200° C.

3. A process according to claim 1 wherein said temperature is between about 115° C. and 150° C.

4. A process according to claim 1 wherein $R_1$ is an alkyl radical having from 1 to 4 carbon atoms inclusive.

5. A process according to claim 4 wherein $R_1$ is a methyl radical.

6. A process according to claim 1 wherein said aryl compound is a mono substituted aryl compound the substitution constituent of which is represented by the symbol —OR, where R is selected from the group consisting of aryl and alkyl.

7. A process according to claim 1 wherein said aryl compound is toluene.

8. A process according to claim 1 wherein said aryl compound is 1–3 xylene.

9. A process according to claim 1 wherein said aryl compound is 1–4 xylene.

10. A process according to claim 1 wherein said aryl compound is chlorobenzene.

11. A process according to claim 1 wherein said aryl compound is anisole.

12. A process according to claim 1 wherein said reaction is performed over a period of at least 3 hours.

13. A process according to claim 1 wherein said solvent is tetrachloroethylene.

References Cited by the Examiner

FOREIGN PATENTS 1,111,173   7/1961   Germany.

OTHER REFERENCES

Baliah et al., J. Indian Chem. Soc. 38, 33–40 (1961), cited in Chem. Abs. 55, 17208d (1961).

Burton et al., J. Chem. Soc., 1945, 14–18, cited in Chem. Abs. 39, 27414 (1945).

CHARLES B. PARKER, *Primary Examiner.*

DANIEL D. HORWITZ, DELBERT R. PHILLIPS,
*Assistant Examiners.*